United States Patent
Han et al.

(10) Patent No.: US 10,686,198 B2
(45) Date of Patent: Jun. 16, 2020

(54) FUEL CELL ASSEMBLY

(71) Applicant: Temasek Polytechnic, Singapore (SG)

(72) Inventors: Ming Han, Singapore (SG); Ee Ho Gareth Tang, Singapore (SG); Yunzhong Chen, Singapore (SG)

(73) Assignee: TEMASEK POLYTECHNIC, Singapore (SG)

( * ) Notice: Subject to any disclaimer, the term of this patent is extended or adjusted under 35 U.S.C. 154(b) by 379 days.

(21) Appl. No.: 14/908,316

(22) PCT Filed: Jul. 30, 2013

(86) PCT No.: PCT/SG2013/000320
§ 371 (c)(1),
(2) Date: Jan. 28, 2016

(87) PCT Pub. No.: WO2015/016769
PCT Pub. Date: Feb. 5, 2015

(65) Prior Publication Data
US 2016/0164111 A1    Jun. 9, 2016

(51) Int. Cl.
*H01M 8/0258* (2016.01)
*H01M 8/0273* (2016.01)
(Continued)

(52) U.S. Cl.
CPC ....... *H01M 8/0258* (2013.01); *H01M 8/0254* (2013.01); *H01M 8/0267* (2013.01);
(Continued)

(58) Field of Classification Search
CPC ............ H01M 8/0258; H01M 8/0273; H01M 8/04067; H01M 8/2475; H01M 8/0267;
(Continued)

(56) References Cited

U.S. PATENT DOCUMENTS 5,342,706 A * 8/1994 Marianowski ...... H01M 8/0206
429/460
5,906,898 A * 5/1999 Pondo ................... H01M 8/241
429/429

(Continued)

FOREIGN PATENT DOCUMENTS

| CN | 102324533 A | 1/2012 |
| GB | 2494875 | 3/2013 |
| JP | 2000-21434 A | 1/2000 |

OTHER PUBLICATIONS

Chinese Office Action 100084 from counterpart Chinese Application No. 201380079907.5 dated Oct. 9, 2017.
(Continued)

*Primary Examiner* — Michael L Dignan
(74) *Attorney, Agent, or Firm* — Preston Smirman; Smirman IP Law, PLLC (57) ABSTRACT

A fuel cell assembly (10) is provided. The fuel cell assembly (10) includes a first endplate (12), a second endplate (14), a plurality of separator plates (16) provided between the first and second endplates (12) and (14), and a plurality of fuel cells (18) forming a fuel cell stack (20). Each of the fuel cells (18) is provided between adjacent ones of the separator plates (16). A plurality of oxidant flow channels (22) is formed in the separator plates (16). The oxidant flow channels (22) define a first flow passage. Each of the fuel cells (18) has an active area. A portion (28) of the separator plates (16) extends beyond the active area of the fuel cells (18) to define a second flow passage at a downstream portion of the first flow passage.

9 Claims, 8 Drawing Sheets

(51) Int. Cl.
- *H01M 8/0267* (2016.01)
- *H01M 8/241* (2016.01)
- *H01M 8/0254* (2016.01)
- *H01M 8/04007* (2016.01)
- *H01M 8/2475* (2016.01)
- *H01M 8/0213* (2016.01)
- *H01M 8/0206* (2016.01)
- *H01M 8/1018* (2016.01)

(52) U.S. Cl.
CPC ..... *H01M 8/0273* (2013.01); *H01M 8/04067* (2013.01); *H01M 8/2415* (2013.01); *H01M 8/2475* (2013.01); *H01M 8/0206* (2013.01); *H01M 8/0213* (2013.01); *H01M 2008/1095* (2013.01)

(58) Field of Classification Search
CPC ............ H01M 8/2415; H01M 8/2485; H01M 8/0254; H01M 2008/1095; H01M 8/0213; H01M 8/0206
See application file for complete search history.

(56) References Cited

U.S. PATENT DOCUMENTS

| | | | | |
|---|---|---|---|---|
| 6,613,467 | B1 * | 9/2003 | Chizawa | ............... H01M 8/023 429/413 |
| 6,635,375 | B1 | 10/2003 | Geisbrecht et al. | |
| 7,807,313 | B2 * | 10/2010 | Kaye | ................. H01M 8/04037 429/465 |
| 8,808,938 | B2 * | 8/2014 | Hahn | ................. H01M 8/04014 429/439 |
| 2006/0024560 | A1 | 2/2006 | Ishioka et al. | |
| 2006/0105213 | A1 * | 5/2006 | Otsuka | ...................... F28F 3/04 429/435 |
| 2006/0204806 | A1 * | 9/2006 | Takada | ................. H01M 8/0267 429/434 |
| 2007/0009775 | A1 | 1/2007 | Lee | |
| 2007/0072051 | A1 | 3/2007 | Sato | |
| 2008/0138692 | A1 * | 6/2008 | Mogi | ................. H01M 8/04007 429/414 |
| 2011/0081592 | A1 | 4/2011 | Ma et al. | |
| 2011/0117470 | A1 * | 5/2011 | Aras | ................. H01M 8/04014 429/452 |
| 2011/0281190 | A1 | 11/2011 | Skinkle | |

OTHER PUBLICATIONS

A.P. Sasmito a, E. Birgersson b, K.W. Lum c, A.S. Mujumdar; Fan selection and stack design for open-cathode polymer electrolyte fuel cell stacks; journal homepage: www.elsevier.com/locate/renene; Renewable Energy 37 (2012) 325-332 ; 8 pages.

Agus P. Sasmito a,b, Erik Birgersson a,b, Arun S. Mujumdar; A novel flow reversal concept for improved thermal management in polymer electrolyte fuel cell stacks; International Journal of Thermal Sciences; journal homepage: www.elsevier.com/locate/ijts; International Journal of Thermal Sciences 54 (2012) 242-252; 11 pages.

* cited by examiner

FUEL CELL ASSEMBLY

FIELD OF THE INVENTION

The present invention relates to fuel cell technology and more particularly to an open-cathode proton exchange membrane fuel cell (PEMFC) assembly.

BACKGROUND OF THE INVENTION

Open-cathode proton exchange membrane (PEM) fuel cells have a simple construction and minimal balance of plant. Such fuel cells operate in ambient air and are thus less costly and complex and consume less parasitic power than close-cathode fuel cells, which require the provision of oxidant flow channels and external oxidant supply systems.

However, in high power operations, heat management of open-cathode PEM fuel cells is an issue, particularly for compact fuel cell stacks, as large quantities of heat are generated in small and limited spaces.

Efficient and even cooling is required for stable operation of fuel cells. Accumulated heat dries up proton conductive membranes and results in high ohmic losses and a deteriorated power output. Uneven thermal distribution irreversibly damages the membranes and compromises the durability of the fuel cells.

It is therefore desirable to have a fuel cell assembly that can be cooled effectively and that operates with a substantially uniform thermal distribution.

SUMMARY OF THE INVENTION

Accordingly, in a first aspect, there is provided a fuel cell assembly including a first endplate, a second endplate, a plurality of separator plates provided between the first and second endplates, and a plurality of fuel cells forming a fuel cell stack, each of the fuel cells being provided between adjacent ones of the separator plates. A plurality of oxidant flow channels is formed in the separator plates. The oxidant flow channels define a first flow passage. Each of the fuel cells has an active area. A portion of the separator plates extends beyond the active area of the fuel cells to define a second flow passage at a downstream portion of the first flow passage.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

Figure 1:
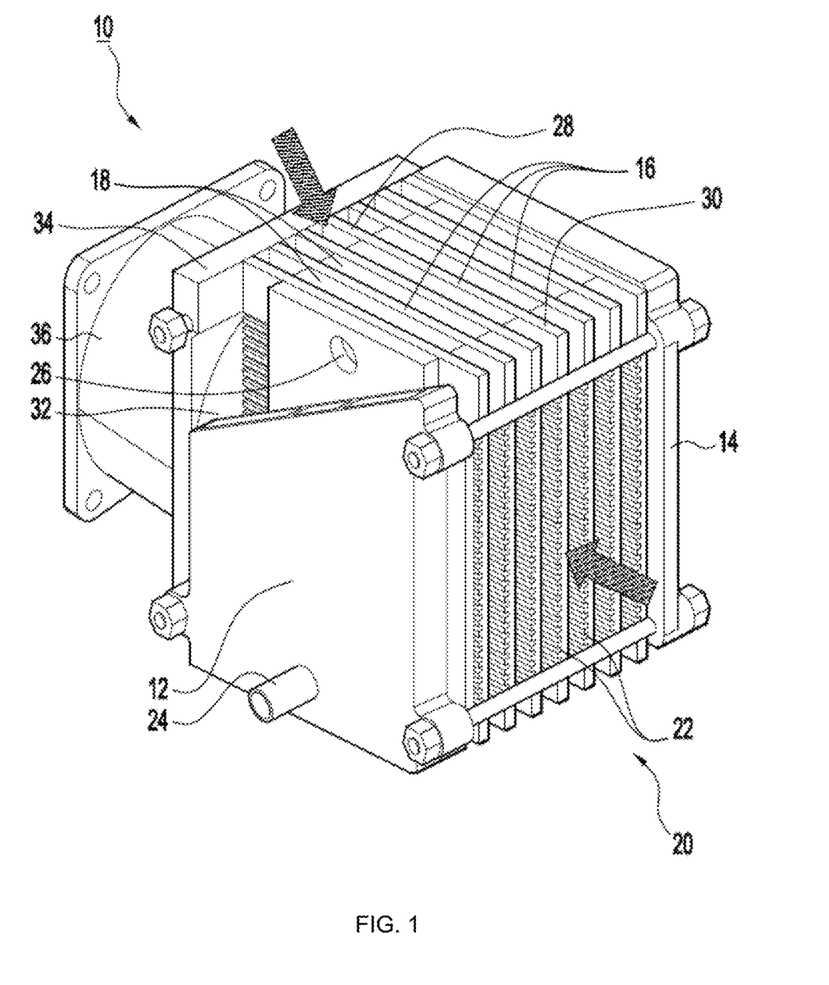
FIG. 1 is a partial cutaway view of a fuel cell assembly in accordance with one embodiment of the present invention.

Referring now to FIG. 1, a partial cutaway view of a fuel cell assembly 10 is shown. The fuel cell assembly 10 includes a first endplate 12, a second endplate 14, a plurality of separator plates 16 provided between the first and second endplates 12 and 14 and a plurality of fuel cells 18 forming a fuel cell stack 20. Each of the fuel cells 18 has an active area and is provided between adjacent ones of the separator plates 16. A plurality of oxidant flow channels 22 is formed in the separator plates 16. In the present embodiment, a fuel inlet 24 is formed in the first endplate 12 and a fuel outlet (not shown) is formed in the second endplate 14. A plurality of fuel flow channels 26 (partially shown) connecting the fuel inlet 24 to the fuel outlet is formed within the fuel cell stack 20.

The oxidant flow channels 22 define a first flow passage. As can be seen from FIG. 1, a first portion 28 of the separator plates 16 extends beyond the active area of the fuel cells 18 to define a second flow passage at a downstream portion of the first flow passage. In the present embodiment, a second portion 30 of the separator plates 16 extends beyond the active area of the fuel cells 18 towards an upstream portion of the first flow passage.

An exhaust chamber 32 is provided downstream of the first and second flow passages. The exhaust chamber 32 is defined in a frame 34 abutting the first portion 28 of the separator plates 16. A flow directing device 36 is received in the frame 34 and is arranged to draw a flow of fluid through the first and second flow passages.

The fuel cell assembly 10 of the present embodiment is of an open-cathode design. Individual ones of the fuel cells 18 are stacked together between the first and second endplates 12 and 14 to form an open-cathode fuel cell stack 20.

The separator plates 16 include a central portion that is in contact with the individual fuel cells 18 and forms an active zone with the fuel cells 18. In the present embodiment, the first and second portions 28 and 30 of the separator plates 16 extending beyond the active area of the fuel cells 18 are formed as a plurality of radiating fins 28 and 30, respectively, and have therefore a special radiating function. Open spaces are present between adjacent ones of the radiating fins 28 and 30 due to an absence of the active zone. Depending on the required application, a length ratio of the radiating fins 28 and 30 to the active area of the fuel cells 18 may be between about 1:3 and about 1:15. In one embodiment, a length ratio of the radiating fins 28 and 30 to the active area of the fuel cells 18 is about 1:6. To facilitate conduction of heat generated in the active zone to the radiating fins 28 and 30 and then to the air flowing through, the separator plates 16 are made of a material with good thermal conductivity. The material from which the separator plates 16 are made is preferably also corrosion resistant and electrically conductive. In preferred embodiments, the separator plates 16 are formed of graphite, a carbon-containing composite or a plurality of corrugated metal sheets. In the present embodiment, the radiating fins 28 and 30 are integrally formed with the central portion of the separator plates 16. Advantageously, this allows manufacture of the fuel cell assembly 10 with pre-existing fuel cell manufacturing equipment and reduces implementation costs by doing away with the need to provide additional new equipment for the manufacture of the fuel cell assembly 10. Although illustrated as extending both downstream and upstream of the first flow passage, it should be understood by those of ordinary skill in the art that the present invention is not limited to fuel cell assemblies with separator plates extended on both sides of the fuel cell stack 20. In an alternative embodiment, the separator plates 16 may extend only towards the downstream portion of the first flow passage.

Figure 2:
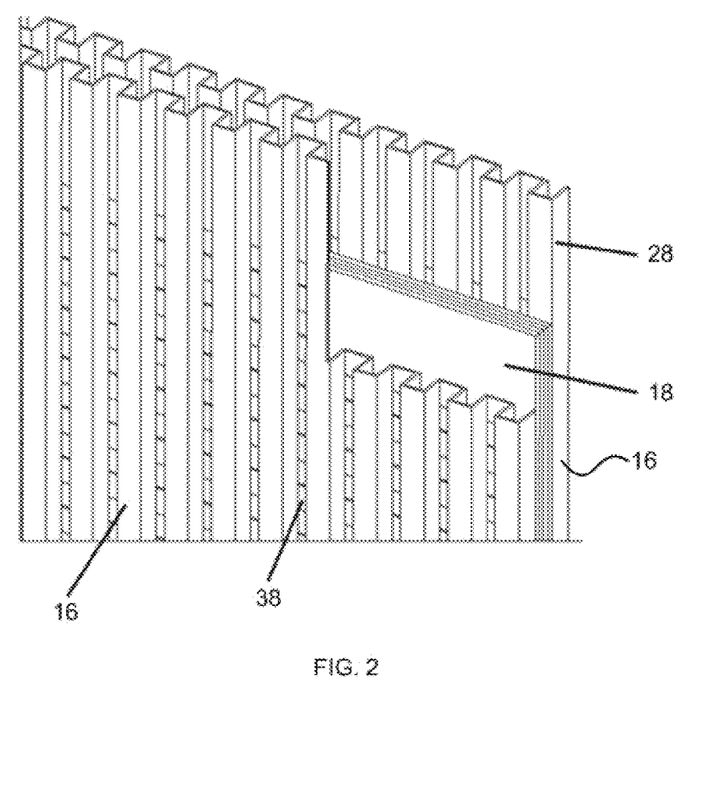
FIG. 2 is an enlarged schematic partial cutaway view of a fuel cell provided between adjacent ones of a pair of separator plates in accordance with one embodiment of the present invention.

Referring now to FIG. 2, an enlarged schematic partial cutaway view of one of the fuel cells 18 provided between adjacent ones of a pair of separator plates 16 is shown. As can be seen from FIG. 2, the single fuel cell 18 is sandwiched between a pair of separator plates 16. A portion of one of the separator plates 16 is cutaway to show the single cell 18. The area with the single cell 18 is the active zone where electrochemical reactions take place during cell operation. The portion 28 of the separator plates 16 extending beyond the active zone forms the radiating fins 28. In the embodiment shown, the separator plates 16 are corrugated metal sheets having a plurality of parallel grooves 38. The grooves 38 provide airflow channels between adjacent layers of the fuel cell stack 20. In the present embodiment, the separator plates 16 are formed with open grid-like superstructures to facilitate air access while simultaneously providing cell compression and current collection.

Figure 3:
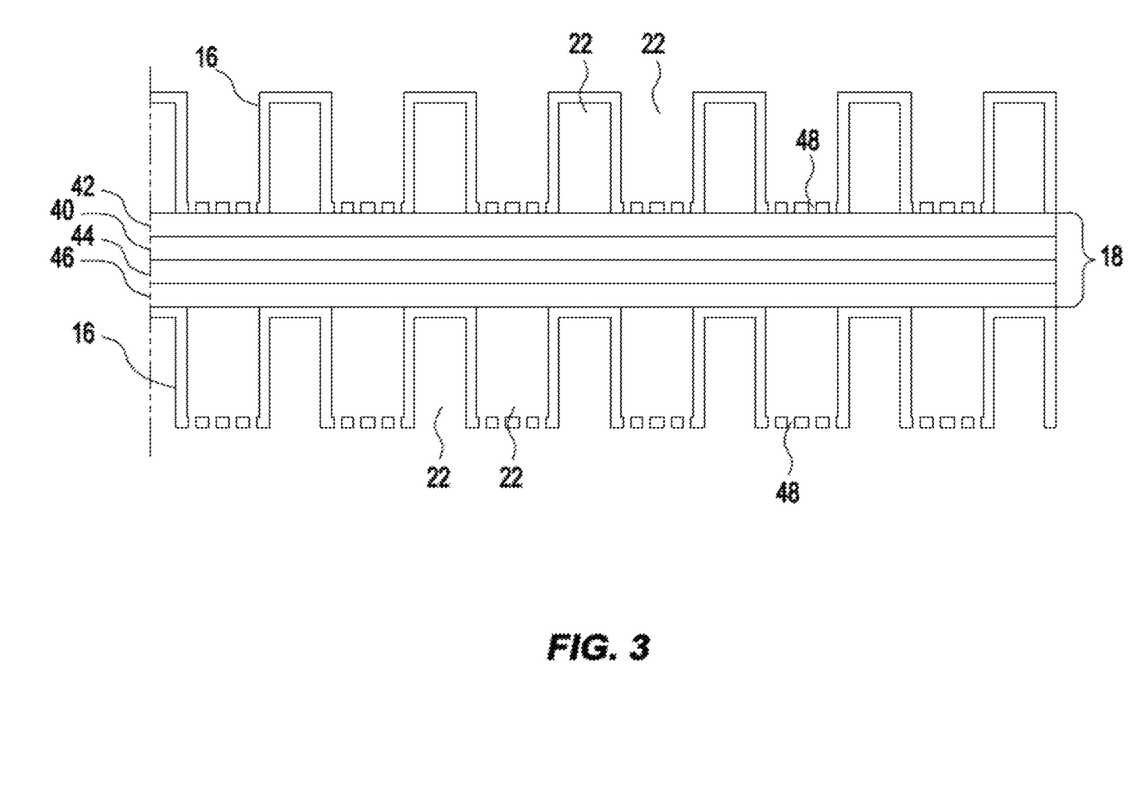
FIG. 3 is an enlarged schematic cross-sectional view of the fuel cell and the separator plates of FIG. 2.

Referring now to FIG. 3, an enlarged schematic cross-sectional view of the fuel cell 18 and the separator plates 16 of FIG. 2 is shown. As shown in FIG. 3, the fuel cell 18 includes a catalyst coated membrane (CCM) 40 provided between a first gas diffusion layer (GDL) 42 and a second gas diffusion layer 44. An anode plate 46 is provided between one of the separator plates 16 and the second gas diffusion layer 44. The anode plate 46 contacts the separator plate 16 on a first side and the second gas diffusion layer 44 on a second side. The oxidant flow channels 22 are formed in the separator plates 16 adjacent the first gas diffusion layer 42 and the anode plate 46. In the present embodiment, a plurality of through holes 48 is formed in surfaces of the separator plates 16 contacting a cathode side of the fuel cells 18.

The oxidant flow channels 22 serve as conduits for airflow through the fuel cell stack 20. The airflow provides oxidant for fuel cell reactions and also carries away heat generated in the fuel cells 18.

The anode plate 46 separates the fuel from the oxidant, provides cell compression and has a current collecting function.

The provision of the through holes 48 in the separator plates 16 at the portions contacting the first gas diffusion layer 42 helps promote oxidant distribution. More particularly, the oxidant in the oxidant flow channels 22 passes through the through holes 48 to the first gas diffusion layer 42 and this promotes the electrochemical reactions occurring at the cathode side of the fuel cell 18.

Fuel is supplied to the second gas diffusion layer 44 via a plurality of fuel flow channels. The fuel is distributed through the porous medium of the second gas diffusion layer 44 and is split into protons and electrons at the catalyst sites of the catalyst coated membrane 40. The protons pass through the membrane 40 and combine with the oxidant from the oxidant flow channels 22 that is diffused in the first gas diffusion layer 42 to form water. The electrons pass through a current collector and external circuitry and electricity is thus generated.

Referring again to FIG. 1, the fuel is supplied to the fuel cell stack 20 via the fuel inlet 24. In one embodiment, the fuel that is supplied to the fuel cell stack 20 is hydrogen. Although described in the present embodiment as being provided on different endplates, it should be understood by those of ordinary skill in the art that the present invention is not limited by the positioning of the fuel inlet 24 and the fuel outlet. The fuel inlet 24 and the fuel outlet may be provided on the same endplate in an alternative embodiment.

As shown in FIG. 1, the exhaust chamber 32 is formed in the frame 34 provided at the downstream portion of the first flow passage. In one embodiment, the exhaust chamber 32 is a vacuum chamber.

The flow directing device 36 is held in the frame 34 and is employed to draw or suck air through the oxidant flow channels 22 to provide oxidants for the electrochemical reactions occurring at the active zone of the fuel cells 18. The flow of air through the oxidant flow channels 22 also helps remove heat generated during the electrochemical reactions. Because a second flow passage is provided, air is also taken in at the first portion 28 of the separator plates 16 when the flow directing device 36 is in use. More particularly, when the flow directing device 36 is operated in a suction mode, a negative pressure is formed within the exhaust chamber 32 and air is drawn through both the first and second flow passages. Air that is taken in through the first flow passage passes through the second portion 30 of the separator plates 16, the oxidant flow channels 22 and then through the first portion 28 of the separator plates 16 into the exhaust chamber 32. Air that is taken in through the second flow passage passes through the open space around the first portion 28 of the separator plates 16 and then into the exhaust chamber 32. The airflow through the first flow passage provides oxidants to the fuel cells 18 and removes heat generated in the active zone. The airflow through the second flow passage provides additional cooling to the radiating fins 28 when the air passing through comes in contact with the fin surfaces. The secondary airflow helps with the establishment of a uniform thermal distribution along the active zone as the airflow through the first flow passage becomes hotter as it passes through the active zone and is therefore unable to cool a downstream portion of the fuel cell stack 20 as effectively compared to an upstream portion of the fuel cell stack 20 on its own. In one embodiment, the flow directing device 36 is an axial fan.

Advantageously, heat removal from the fuel cell stack 20 of the fuel cell assembly 10 is by direct heat conduction via the airflows through the first and second flow passages. Direct heat conduction as a cooling means is more effective than heat removal via radiation alone.

Further advantageously, although the total volume of airflow is increased in the present embodiment, the power consumption of the flow directing device 36 is not however increased. This is attributed to a decrease in flow resistance in the oxidant flow channels 22 when a secondary airflow is taken in through the open space around the radiating fins 28.

Figure 4:
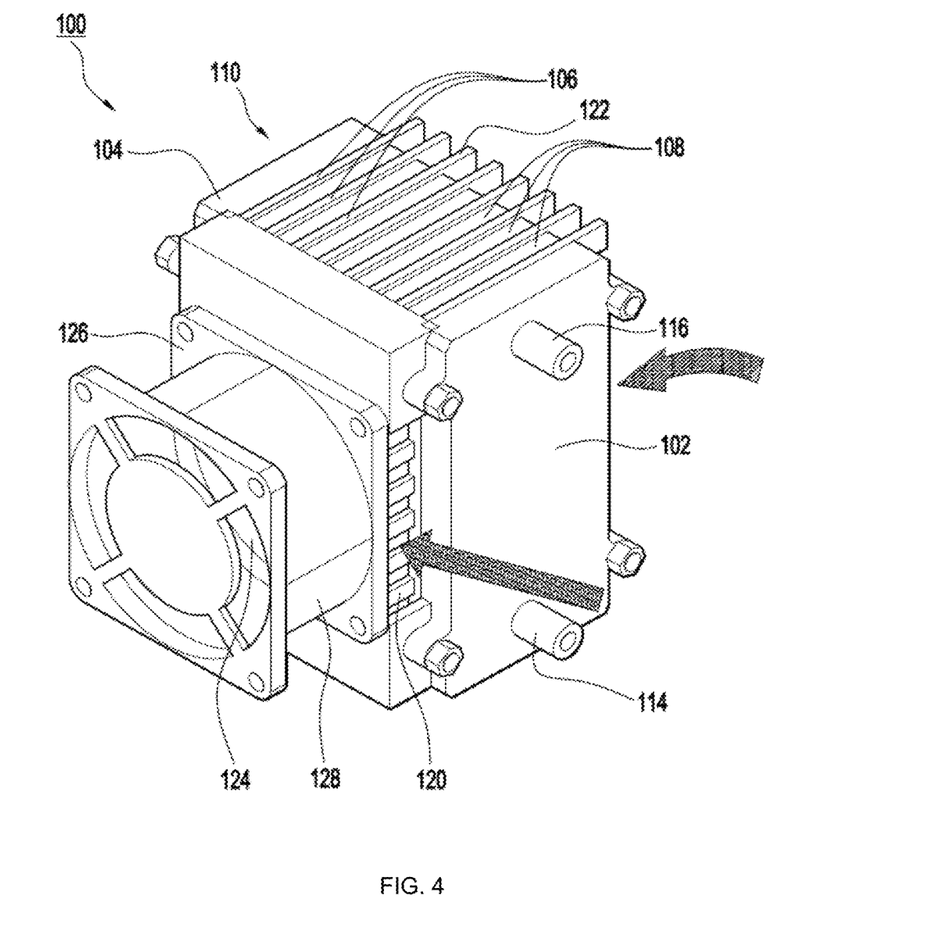
FIG. 4 is a front perspective view of a fuel cell assembly in accordance with another embodiment of the present invention.
Figure 5:
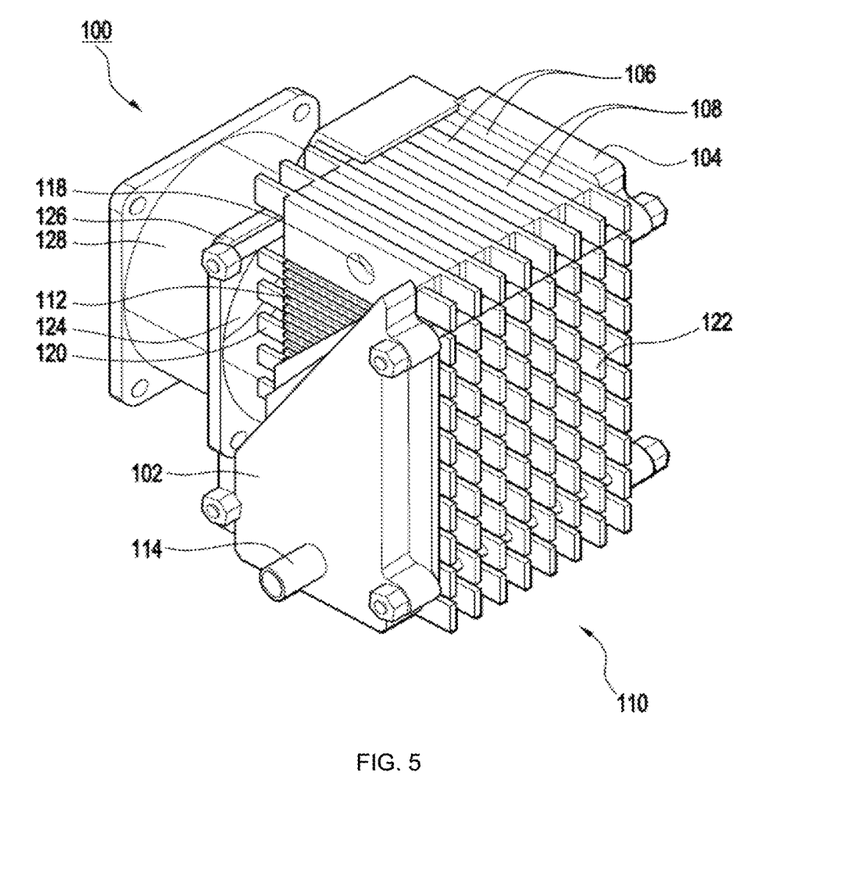
FIG. 5 is a partial cutaway rear perspective view of the fuel cell assembly of FIG. 4.

Referring now to FIGS. 4 and 5, a fuel cell assembly 100 in accordance with another embodiment of the present invention is shown. The fuel cell assembly 100 includes a first endplate 102, a second endplate 104, a plurality of separator plates 106 provided between the first and second endplates 102 and 104 and a plurality of fuel cells 108, each of the fuel cells 108 being provided between adjacent ones of the separator plates 106 and having an active area. Individual ones of the fuel cells 108 are stacked together between the first and second endplates 102 and 104 to form an open-cathode fuel cell stack 110. A plurality of oxidant flow channels 112 is formed in the separator plates 106. In the present embodiment, a fuel inlet 114 and a fuel outlet 116 are formed in the first endplate 102. A plurality of fuel flow channels 118 (partially shown) connecting the fuel inlet 114 to the fuel outlet 116 is formed within the fuel cell stack 110.

The oxidant flow channels 112 define a first flow passage. As shown in FIGS. 4 and 5, a first portion 120 of the separator plates 106 extends beyond the active area of the fuel cells 108 to define a second flow passage at a downstream portion of the first flow passage. In the present embodiment, a second portion 122 of the separator plates 106 extends beyond the active area of the fuel cells 108 towards an upstream portion of the first flow passage. In the present embodiment, the first and second portions 120 and 122 of the separator plates 106 extending beyond the active area of the fuel cells 108 are formed as a plurality of radiating fins 120 and 122, respectively.

An exhaust chamber 124 is provided downstream of the first and second flow passages. The exhaust chamber 124 is defined in a frame 126 abutting the first portion 120 of the separator plates 106. A flow directing device 128 is received in the frame 126 and is arranged to draw a flow of air through the oxidant flow channels 112 and the open spaces around the radiating fins 120.

In the embodiment shown, the radiating fins 120 and 122 are formed as a plurality of protrusions 120 and 122 on respective edges of the separator plates 106. The protrusions 120 and 122 may be slender slices that extend from the respective edges of the separator plates 106. Within the active zone of the fuel cell stack 110, the oxidant flow channels 112 are formed on the surface of the separator plates 106.

The fuel cell assembly 100 of the present embodiment operates in a like manner to the fuel cell assembly 10 of the earlier embodiment. When the flow directing device 128 is operated in a suction mode, a first airflow passes through the radiating fins 120 and 122 and the oxidant flow channels 112 to provide oxidant to the active zone and carry out the heat generated. At the same time, a second airflow enters the exhaust chamber 124 through the spaces between the radiating fins 120 and provides additional cooling to the fuel cell stack 110. Accordingly, a detailed description of the operation of the fuel cell assembly 100 is not required for a complete understanding of the present invention.

Figure 6A:
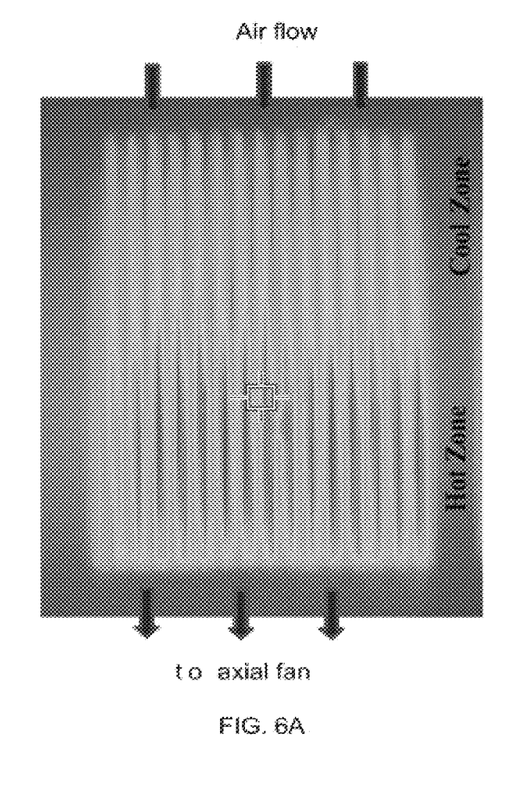
FIG. 6A is a thermogram of a conventional fuel cell assembly.
Figure 6B:
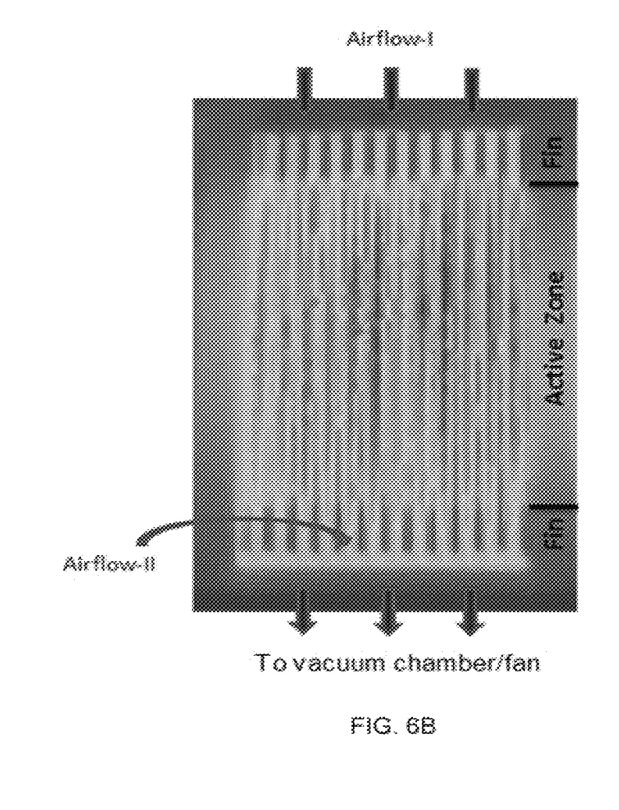
FIG. 6B is a thermogram of a fuel cell assembly in accordance with one embodiment of the present invention.

Referring now to FIGS. 6A and 6B, the thermal performance of a fuel cell in accordance with an embodiment of the present invention was investigated by experimentation. The experiment involved building a conventional open-cathode fuel cell and providing the conventional fuel cell with an axial fan to draw air through the oxidant flow channels. A fuel cell in accordance with an embodiment of the present invention was also built using the same materials and this was also provided with the same type of axial fan. The fuel cell in accordance with an embodiment of the present invention differed from the conventional fuel cell in that the former was formed with radiating fins on the separator plates and provided with a vacuum chamber defined within the frame in which the axial fan is received. The length ratio of the radiating fins to the active zone of the fuel cells was 1:6. Both the conventional fuel cell stack and the fuel cell stack in accordance with an embodiment of the present invention had a length of 55 millimetres (mm), a width of 45 mm and a height of 65 mm. After 10 minutes (min) of stable operation, the thermal distribution of both fuel cells was imaged and the results are shown in FIGS. 6A and 6B. FIG. 6A is a thermogram of the conventional fuel cell assembly and FIG. 6B is a thermogram of the fuel cell assembly in accordance with one embodiment of the present invention.

As is evident from FIG. 6A, the thermal distribution in the conventional fuel cell is uneven. A cool zone with temperatures of between about 39 degrees Celsius (° C.) and about 42° C. was observed upstream of the oxidant flow channels and a hot zone with temperatures up to about 52° C. was observed downstream of the oxidant flow channels. This shows that the air taken in is heated up in the active zone and is incapable of cooling the downstream portion of the oxidant flow channels effectively and thus the thermal distribution in the conventional fuel cell is uneven. Uneven thermal distribution is known to adversely affect the performance and durability of fuel cell assemblies.

In contrast, the thermal distribution along the oxidant flow channels of the fuel cell stack in accordance with an embodiment of the present is relatively even as shown in FIG. 6B. This shows that the air taken in at both ends of the separator plates cools the fuel cell stack effectively to achieve a relatively even thermal distribution of around 48° C. along the whole active zone of the fuel cell stack.

Figure 7:
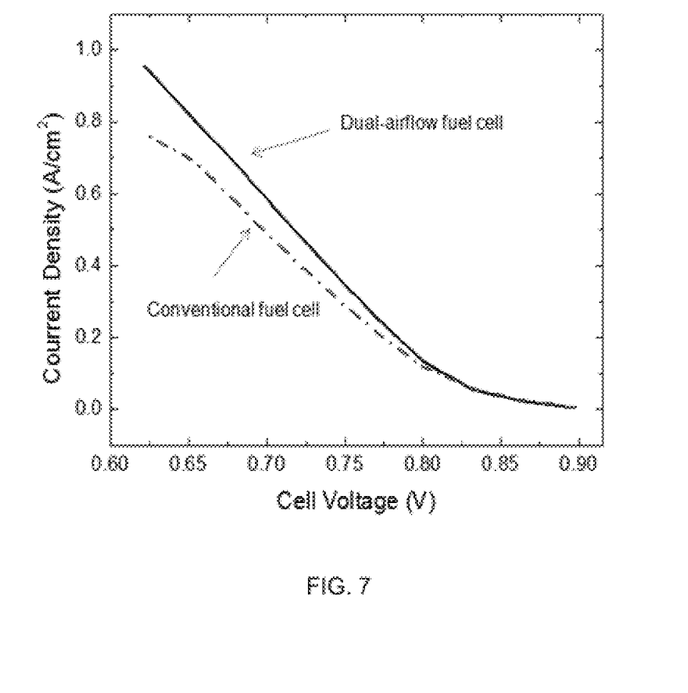
FIG. 7 is a graph comparing a current density of a fuel cell assembly in accordance with one embodiment of the present invention against that of a conventional fuel cell.
Figure 8:
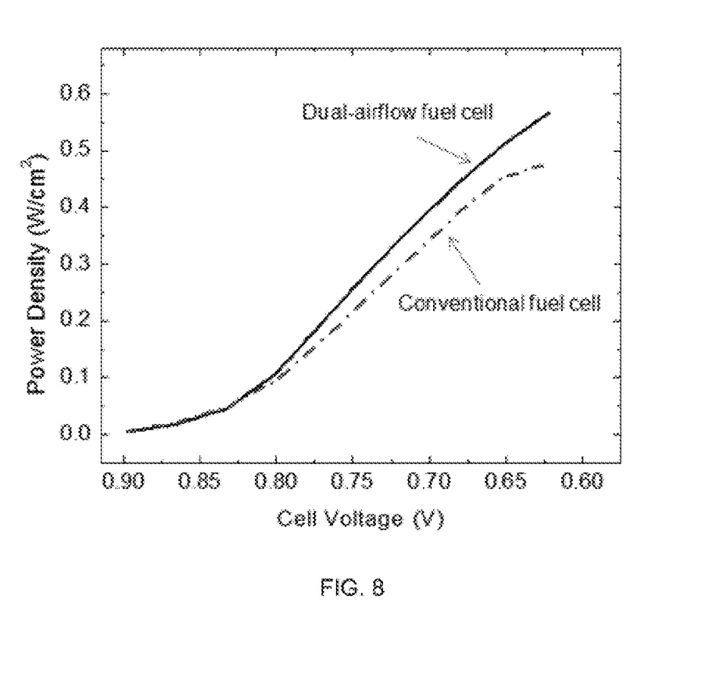
FIG. 8 is a graph comparing a power density of a fuel cell assembly in accordance with one embodiment of the present invention against that of a conventional fuel cell.

Referring now to FIGS. 7 and 8, a second experiment was performed to investigate the electrical performance of a fuel cell assembly in accordance with an embodiment of the present invention. Again, two fuel cell stacks were built with the same materials. Each stack contained fifteen (15) single cells. In the conventional fuel cell stack, the functional area of each fuel cell was 16 square centimetres ($cm^2$). In the fuel cell stack in accordance with an embodiment of the present invention, the functional area of each fuel cell was 12 $cm^2$ as some of the space was taken up by the radiating fins. The length ratio of the radiating fins to the active zone of the fuel cells was 1:6. Both fuel cell assemblies were operated under ambient conditions without additional cooling. Hydrogen was supplied at a pressure of 40 kilopascals (kPa) and the fan was powered at 5 watts (W).

The results of the second experiment are shown in FIGS. 7 and 8. All the experimental data have been normalized through active area and per cell voltage. FIG. 7 is a graph comparing a current density of the fuel cell assembly in accordance with one embodiment of the present invention against that of the conventional fuel cell. FIG. 8 is a graph comparing a power density of the fuel cell assembly in accordance with one embodiment of the present invention against that of the conventional fuel cell. The experimental results of the fuel cell assembly in accordance with one embodiment of the present invention are indicated by solid lines and that of the conventional fuel cell are indicated by dashed lines.

As can be seen from FIGS. 7 and 8, the power output of both stacks is comparable despite the differences in the functional areas. In fact, the output power densities of the fuel cell assembly in accordance with one embodiment of the present invention are noticeably better than that of the conventional fuel cell. At the same per cell voltage, the fuel cell assembly in accordance with one embodiment of the present invention achieves a higher output current density and a higher power density. The differences are even more apparent at normal working voltages. The better performance of the fuel cell assembly in accordance with one embodiment of the present invention is attributed to the effective cooling and even thermal distribution produced by the dual-airflow capability of the fuel cell assembly in accordance with one embodiment of the present invention.

As is evident from the foregoing discussion, the present invention provides an open-cathode fuel cell assembly with dual-airflow capability. The upstream air intake passing through the active zone of the fuel cells provides oxidants and helps to cool the fuel cells. The downstream air intake provides additional cooling and helps to achieve uniform thermal distribution within the fuel cell stack. Advantageously, this improves the stability and durability of the fuel cell stack. The fuel cell assembly of the present invention is suitable for portable power applications where power density is critical.

While preferred embodiments of the invention have been illustrated and described, it will be clear that the invention is not only limited to the described embodiments. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A fuel cell assembly, comprising:
a first endplate;
a second endplate;
a plurality of separator plates provided between the first and second endplate, wherein the separator plates have a top surface and a bottom surface, wherein the separator plates comprise a plurality of corrugated metal sheets;
a plurality of oxidant flow channels formed in the separator plates, the oxidant flow channels defining a first flow passage, wherein the oxidant flow channels are defined in the corrugated metal sheets; and
a plurality of fuel cells forming a fuel cell stack, each of the fuel cells being provided between adjacent ones of the separator plates;
wherein each of the fuel cells has an active area;
wherein a first portion of the separator plates extends beyond the active area of the fuel cells to define a second flow passage at a downstream portion of the first flow passage;
wherein the first flow passage is formed on a first major face of the assembly;
wherein the second flow passage is formed on a second major face of the assembly;
wherein the first and second major faces are transverse to one another;
wherein an exposed open space is provided around the first extended portion of the separator plates;
wherein a second portion of the separator plates extends beyond the active area of the fuel cells towards an upstream portion of the first flow passage;
wherein an exhaust chamber is provided downstream of the first and second flow passages;
wherein the exhaust chamber is positioned centrally between the top and bottom surfaces of the separator plates;
wherein the exhaust chamber is defined in a frame abutting the first extended portion of the separator plates defining the second flow passage;
wherein the exposed open space is positioned between an edge surface of either the first and second endplates and the frame;
wherein a flow directing device is received in the frame and arranged to draw a first flow of fluid through the oxidant flow channels in a first direction and a second flow of fluid through the exposed open space around the first extended portion of the separator plates in a second direction such that an air flow enters the exhaust chamber through spaces between a plurality of radiating fins defined by the first extended portion of the separator plates;
wherein the first direction is transverse to the second direction;
wherein the first flow of fluid is directly over the fuel cell stack.

2. The fuel cell assembly of claim 1, wherein a length ratio of the radiating fins to the active area of the fuel cells is between about 1:3 and about 1:15.

3. The fuel cell assembly of claim 2, wherein the length ratio of the radiating fins to the active area of the fuel cells is about 1:6.

4. The fuel cell assembly of claim 1, wherein the radiating fins comprise a plurality of protrusions on respective edges of the separator plates.

5. The fuel cell assembly of claim 1, further comprising a plurality of through holes formed in surfaces of the separator plates contacting a cathode side of the fuel cells, and wherein each of the oxidant flow channels defined in the corrugated metal sheets is of a rectangular cross-section.

6. The fuel assembly of claim 1, wherein the flow directing device is an axial fan.

7. The fuel assembly of claim 1, wherein each of the fuel cells is a single fuel cell.

8. The fuel assembly of claim 1, wherein the first flow passage and the second flow passage are for air intake.

9. The fuel assembly of claim 1, wherein the first extended portion of the separator plates is located outside of the exhaust chamber.

* * * * *